US012750848B2

United States Patent

(12) United States Patent
Khoshabi Nobar et al.

(10) Patent No.: US 12,750,848 B2

(45) Date of Patent: Sep. 29, 2026

(54) METHODS FOR ENHANCING SCHEDULING EFFICIENCY IN HARQ-ACK DISABLED IoT NTN

(71) Applicant: Mavenir Systems, Inc., Richardson, TX (US)

(72) Inventors: Sina Khoshabi Nobar, Ottawa (CA); Neng Wang, Lund (SE)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 18/607,731

(22) Filed: Mar. 18, 2024

(65) Prior Publication Data

US 2024/0340888 A1 Oct. 10, 2024

Related U.S. Application Data

(60) Provisional application No. 63/494,856, filed on Apr. 7, 2023.

(51) Int. Cl.

| | |
|---|---|
| ***H04L 1/1822*** | (2023.01) |
| ***H04L 1/1812*** | (2023.01) |
| ***H04L 1/1825*** | (2023.01) |
| ***H04L 1/1829*** | (2023.01) |
| ***H04L 1/1867*** | (2023.01) |
| ***H04W 72/1268*** | (2023.01) |
| *H04W 84/06* | (2009.01) |

(52) U.S. Cl.

CPC ....... *H04W 72/1268* (2013.01); *H04L 1/1812* (2013.01); *H04W 84/06* (2013.01)

(58) Field of Classification Search

CPC .............. H04W 72/1268; H04W 84/06; H04L 1/1812; H04L 1/1825; H04L 1/1854; H04L 1/1896; H04L 1/1822

See application file for complete search history.

(56) References Cited

U.S. PATENT DOCUMENTS

2020/0314886 A1* 10/2020 Cohen ..................... H04W 4/70
2021/0391952 A1* 12/2021 Hofström .............. H04L 1/1864
2024/0292411 A1* 8/2024 Ying ................. H04W 72/1268

OTHER PUBLICATIONS

Extended European Search Report for corresponding European application 24168376.2 pages, dated Aug. 14, 2024.

(Continued)

*Primary Examiner* — Nishant Divecha
*Assistant Examiner* — James P Seymour
(74) *Attorney, Agent, or Firm* — Ruggiero McAllister & McMahon LLC

(57) ABSTRACT

A system and method is provided for increasing a peak data rate achieved in HARQ feedback-disabled User Equipment (UE) in a Narrow Band Internet of Things (NB-IoT) non-terrestrial network (NTN) system where NB-IoT devices are connected to the gNodeB (gNB) through a satellite where a Downlink Control Information (DCI) N0 is received at the UE and the UE checks a Hybrid Automatic Repeat Request (HARQ) process number field to confirm the HARQ feedback is disabled, where the system determines an actual number of scheduled Transmission Blocks (TB) in an Uplink based on a New Data Indicator field and a Number of Scheduled TBs for Unicast field in the DCI N0. The actual number of scheduled TBs being greater than two without adding new bits to the DCI N0.

8 Claims, 5 Drawing Sheets

(56) References Cited

OTHER PUBLICATIONS

Yan Cheng et al: "Discussion On Disabling 1-16 Of HARQ Feedback For Iot NTN", 3GPP Draft; RI-2300119; Type Discussion; IOT_NTN_ENH-CORE, 3rd Generation Partnership Project (3GPP), Mobile Competence Centre; 650, Route Des Lucioles; F-06921 Sophia-Antipolis Cedex; France; vol. 3GPP RAN 1, No. Athens, GR; Feb. 17, 2023.
Intel Corporation: "Scheduling of multiple DL/UL TBS for NB-IoT", 3GPP Draft; RI-1904272, 3rd Generation Partnership ProjecT (3GPP), Mobile Competence Centre; 650, Route Des Lucioles; F-06921 Sophia-Antipolis Cedex; France; vol. Ran Wg1, No. Xi'an, China; Apr. 8, 2019-Apr. 12, 2019; Apr. 7, 2019.
Patrick Merias et al.: "FLS#I on disabling 1-16 of HARQ feedback for IoT NTN", 3GPP Draft; RI-2301803; Type Discussion; IOT_NTN_ENH-CORE, 3rd Generation Partnership Project (3GPP), Mobile Competence Centre; 650, Route Des Lucioles; F-06921 Sophia-Antipolis Cedex; France; vol. 3GPP RAN 1, No. Athens, GR; Feb. 28, 2023.
Wang Gang et. al.: "Disabling of HARQ feedback for IoT NTN", 3GPP Draft; RI-2300825; Type Discussion; IOT_NTN_ENH-CORE, 3rd Generation Partnership Project (3GPP), Mobile Competence Centre; 650, Route Des Lucioles; F-06921 Sophia-Antipolis Cedex; France; vol. 3GPP RAN 1, No. Athens, GR; Feb. 17, 2023.
Gerardo Medina et al.: "On disabling HARQ 1-16 feedback for IoT NTN", 3GPP Draft; RI-2301151; Type Discussion; Iot_Ntn_Enh-Core, 3rd Generation Partnership Project (3GPP), Mobile Competence Centre; 650, Route Des Lucioles; F-06921 Sophia-Antipolis Cedex; France vol. 3GPP RAN 1, No. Athens, GR; Feb. 17, 2023.
Jingyuan Sun et al.: "Disabling of HARQ feedback for NB-IoT/eMTC over NTN", 3GPP Draft; RI-2301566; Type Discussion; IOT_NTN_ENH-CORE, 3rd Generation Partnership Project (3GPP), Mobile Competence Centre; 650, Route Des Lucioles; F-06921 Sophia-Antipolis Cedex; Francevol. 3GPP RAN 1, No. Athens, GR; Feb. 17, 2023.
ERICSSON: "Scheduling of multiple DL/UL transport blocks in Nb-IoT", 3GPP Draft; RI-1901748 Scheduling Of Multiple Dl-Ul Transport Blocks In Nb-Iot, 3rd Generation Partnership Project (3GPP), Mobile Competence Centre; 650, Route Des Lucioles; F-06921 Sophia-Antipolis; vol. RAN WG1, No. Athens, Greece; Feb. 15, 2019.

* cited by examiner

METHODS FOR ENHANCING SCHEDULING EFFICIENCY IN HARQ-ACK DISABLED IoT NTN

CROSS REFERENCE TO RELATED APPLICATIONS

This application claims the benefit of U.S. Application 63/494,856, filed Apr. 7, 2023 the contents of which are incorporated by reference herein.

BACKGROUND

1. Field of the Invention

The invention is directed to the field of Narrow Band Internet of Things (NB-IoT) non-terrestrial network (NTN), where NB-IoT devices are connected to the gNodeB (gNB) through a satellite.

2. Description of Related Art

The 3$^{rd}$ Generation Partnership Project (3GPP) started to extend its 5th Generation (5G) wireless standard to support mobile access through satellites. The Narrow Band Internet of Things (NB-IoT), as a part the 5G standard, is also supporting wireless access through Low/Medium/Geostationary Earth Orbit (LEO/MEO/GEO) satellites. In the context of 5G standard, a network with satellite support is called a non-terrestrial network (NTN).

To enhance the scheduling efficiency in Uplink (UL) and Downlink (DL) directions, 3GPP has already included multi-Transmission Block (TB) scheduling capability in the specification for NB-IoT (npusch-MultiTB-Config and npdsch-MultiTB-Config for UL and DL, respectively), which means multiple TBs can be scheduled using single Downlink Control Information (DCI). In NB-IoT case, because of the limited number of Hybrid Automatic Repeat Request (HARQ) processes, a maximum of two TBs can be scheduled. Therefore, only a single bit in DCI is assigned to indicate the number of scheduled TBs ("Number of scheduled TB" field in DCI). According to Table 1, this solution increases the User Equipment (UE) UL peak data rate by 98%, 84%, 79%, and 55% for GEO, LEO1200, LEO600, and terrestrial NB-IoT.

One of the main characteristics of the NTN is the longer Round Trip Time (RTT) compared to the terrestrial network. The long RTT is due to the very long distance between the satellite in the sky and the User Equipment (UE)/gNB on the surface of the earth. On the other hand, due to the limited number of HARQ processes in NB-IoT (e.g., currently 2), and due to the constrained size of Downlink Control Information (DCI), the number of uplink (UL)/downlink (DL) transmissions scheduled by a single DCI is limited. The protocol limitations in NB-IoT along with the long RTT in NTN will result in a long cycle for scheduling UE using DCI over Narrowband Physical Downlink Control Channel (NPDCCH) and the subsequent UL/DL transmission over Narrowband Physical Uplink Shared Channel (NPUSCH)/Narrowband Physical Downlink Shared Channel (NPDSCH). This long cycle, in turn, will reduce the UE and network peak data rate. This issue is more prominent in the UL direction.

The maximum transport block size (TBS) is 2536 bits. The shortest RU allocation to reach this TBS is when $I_{RU}$=4 (or $N_{RU}$=5). The minimum value for $k_0$ is 8. Assuming the reference point on gNB (hence, $k_{mac}$=0) and based on the mentioned values, the peak data rate values for different scenarios are given in Table 1. Table 1 shows the UE UL peak data rate highlighting the impact of RTT as well as the impact of multi-TB scheduling.

TABLE 1

| | | Single -TB sch. | | Two -TB sch. | |
|---|---|---|---|---|---|
| Scenario | Typical $K_{offset}$ (ms) | Cycle duration (ms) | UL rate (kbps) | Cycle duration (ms) | UL rate (kbps) |
| GEO | 550 | 567 | 4.47 | 572 | 8.87 |
| LEO1200 | 40 | 57 | 44.49 | 62 | 81.81 |
| LEO600 | 25 | 42 | 60.38 | 47 | 107.91 |
| Terrestrial NB-IoT | 0 | 17 | 149.18 | 22 | 230.55 |

The following two points regarding the results presented in Table 1 should be noted:

1) Moving from terrestrial case to GEO satellite, the UL data rate decreases significantly due to longer RTT. The UL transmission always includes one RTT as part of the whole scheduling/transmission cycle. Therefore, the communication protocol should be designed in a way to enhance the efficiency of the scheduling.
2) Moving from single-TB to two-TB scheduling, the peak data rate increases significantly. For the GEO case the data rate for the two-TB case is twice that of the single-TB case. By allocating one HARQ process to each TB, the best peak data rate can be achieved for NB-IoT with maximum of 2 HARQ processes.

In summary, the UL scheduling in NTN is a costly process and the current NB-IoT specification only allows up to two TBs scheduling using a single DCI N0. On the other hand, increasing the number of TBs scheduled by a single DCI N0 requires additional HARQ processes and additional bits in DCI N0. All these constraints will limit the achievable UL data rate.

Accordingly, there is a need for a system that facilitates NB-IoT devices connected to the gNodeB (gNB) through a satellite that overcomes, alleviates, and/or mitigates one or more of the aforementioned and other deleterious effects described above.

SUMMARY

Accordingly, it is desired to provide a system and method in the field of Narrow Band Internet of Things (NB-IoT) non-terrestrial network (NTN), where NB-IoT devices are connected to the gNodeB (gNB) through a satellite.

It is further desired to provide a system and method that increases the peak data rate that can be achieved for NB-IoT.

It is still further desired to provide a system and method that enhances scheduling efficiency in HARQ-ACK disabled IoT NTN.

In one configuration, a system is provided that is based on a feature developed for NR and NB-IoT NTN, referred to as HARQ feedback disabling, where the method is applied on HARQ feedback-disabled UEs.

The system and method may employ the unused bits of DCI for a HARQ feedback-disabled UE to indicate scheduling of more than two TBs. In this way, the method has a minor specification impact allowing the UE to re-interpret some unused bits in DCI when the HARQ feedback is disabled.

The enhancements in UE UL peak data rate comparing to two-TB scheduling case are 97%, 72%, 65%, and 38% for GEO, LEO1200, LEO600, and terrestrial NB-IoT.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In one configuration, a method for increasing a peak data rate that can be achieved in HARQ feedback-disabled User Equipment (UE) in a Narrow Band Internet of Things (NB-IoT) non-terrestrial network (NTN) system where NB-IoT devices are connected to the gNodeB (gNB) through a satellite is provided, the method comprising the steps of: receiving Downlink Control Information (DCI) NO at UE, and the UE checking a Hybrid Automatic Repeat Request (HARQ) process number field. The method further comprises the steps of: confirming HARQ feedback is disabled for the indicated HARQ process number; and determining an actual number of scheduled Transmission Blocks (TB) in an Uplink based on a New Data Indicator field and a Number of Scheduled TBs for Unicast field in the DCI N0. The method is provided such that the actual number of scheduled TBs is greater than two.

In another configuration, a HARQ-ACK resource field and the New Data Indicator field are used along with the Number of Scheduled TBs for Unicast field (6 bits in total) to indicate a total number of total scheduled TBs.

In one configuration a method for increasing a peak data rate in HARQ feedback-disabled User Equipment (UE) in a Narrow Band Internet of Things (NB-IoT) non-terrestrial network (NTN) system where the UE is connected to a gNodeB (gNB) through a satellite is provided, the method comprising the steps of: receiving Downlink Control Information (DCI) NO at the UE, and the UE checking a Hybrid Automatic Repeat Request (HARQ) process number field in the DCI N0. The method further comprises the steps of: the UE confirming that HARQ feedback is disabled for the HARQ process number field, and the UE determining a number of scheduled Transmission Blocks (TB) in an Uplink (UL) based on a New Data Indicator (NDI) field and a Number of Scheduled TBs for Unicast field in the DCI N0. The method is provided such that the number of scheduled TBs being greater than two without adding new bits to the DCI N0.

In another configuration a system for increasing a peak data rate in HARQ feedback-disabled User Equipment (UE) in a Narrow Band Internet of Things (NB-IoT) non-terrestrial network (NTN) system is provided where the UE is connected to a gNodeB (gNB) through a satellite, the system comprising: software executing on a server transmitting Downlink Control Information (DCI) NO via gNodeB (gNB) to a gateway to a satellite and to UE. The system is provided such that the UE checks a Hybrid Automatic Repeat Request (HARQ) process number field in the DCI N0 and confirms that HARQ feedback is disabled for the HARQ process number field. The system is further provided such that the UE determines a number of scheduled Transmission Blocks (TB) in an Uplink (UL) based on a New Data Indicator (NDI) field and a Number of Scheduled TBs for Unicast field in the DCI N0. Finally, the system is provided such that the number of scheduled TBs is greater than two without adding new bits to the DCI N0.

The above-described and other features and advantages of the present disclosure will be appreciated and understood by those skilled in the art from the following detailed description, drawings, and appended claims.

DETAILED DESCRIPTION

Figure 1:
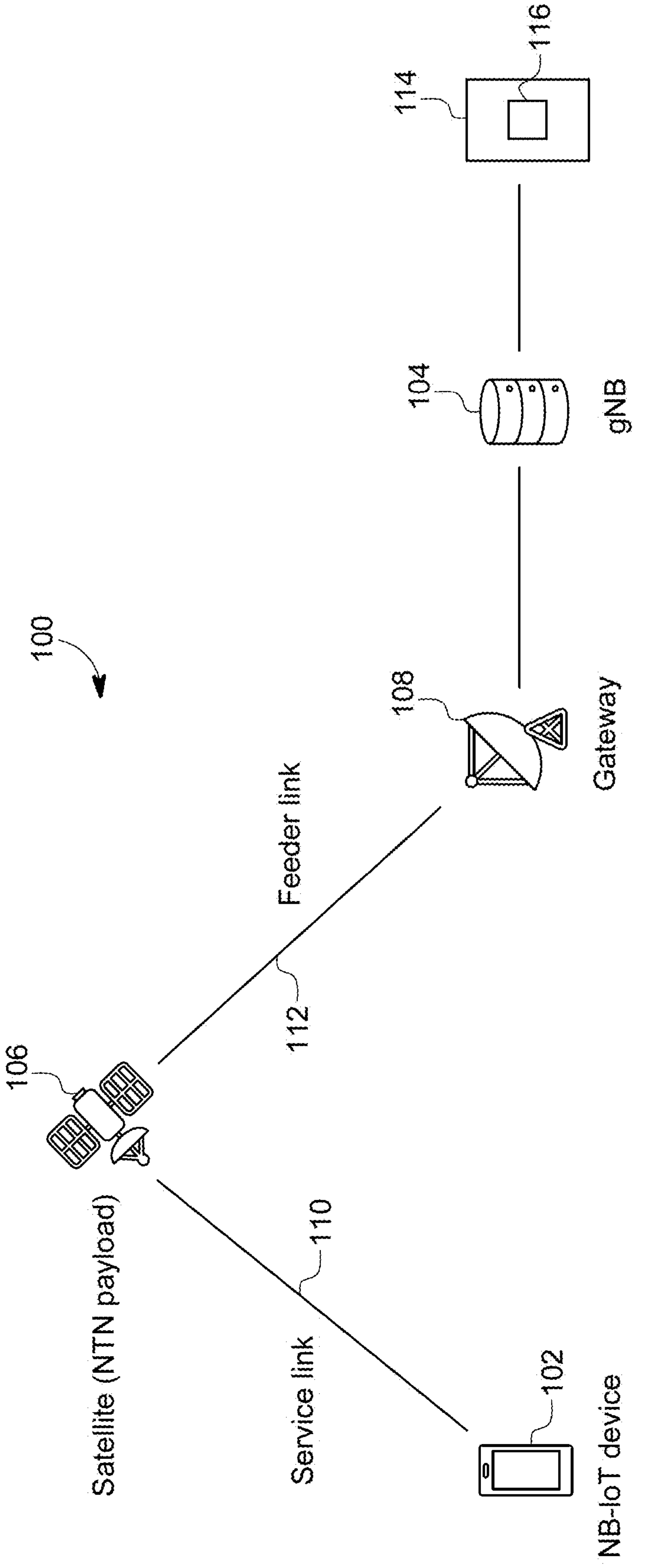
FIG. 1 is an illustration of a Narrow Band Internet of Things (NB-IoT) non-terrestrial network (NTN), where a NB-IoT device is connected to the gNodeB through a satellite according to a configuration of the system.

Referring now to the drawings, wherein like reference numerals designate corresponding structure throughout the views.

FIG. 1 illustrates the overall architecture of HARQ feedback-disabled User Equipment (UE) in a Narrow Band Internet of Things (NB-IoT) non-terrestrial network (NTN) 100 defined in the 3GPP. An NB-IoT device 102, which may comprise, for example, a sensor is connected to the gNB 104 through the link provided by the satellite 106. The gateway 108 is a station providing the satellite 106 access to the gNB 104. The link between the NB-IoT device 102 and the satellite 106, and between the satellite 106 and the gateway 108 are called service link 110 and feeder link 112, respectively. The gNB 104 is coupled to server 114, which may comprise software 116 executing thereon for facilitating increasing a peak data rate in the system 100.

Satellite 106 is called a NTN payload in 3GPP and can be either bent-pipe or regenerative payload. A bent-pipe payload does not have any functionality of radio access network (RAN). It is referred to as a bent-pipe as it represents the U-shape flow of signals since a transponder is just a signal repeater that bounces back any signals received after they are processed and amplified. In essence, bent pipe means a satellite system that transmits to an Earth station essentially the same signal it receives. A regenerative payload implements some of RAN capabilities. The regenerative payload "regenerates" or transforms and amplifies an uplink RF signal with signal-processing techniques before transmitting it on a downlink. The current system is usable with either bent-pipe or regenerative payloads.

Figure 2:
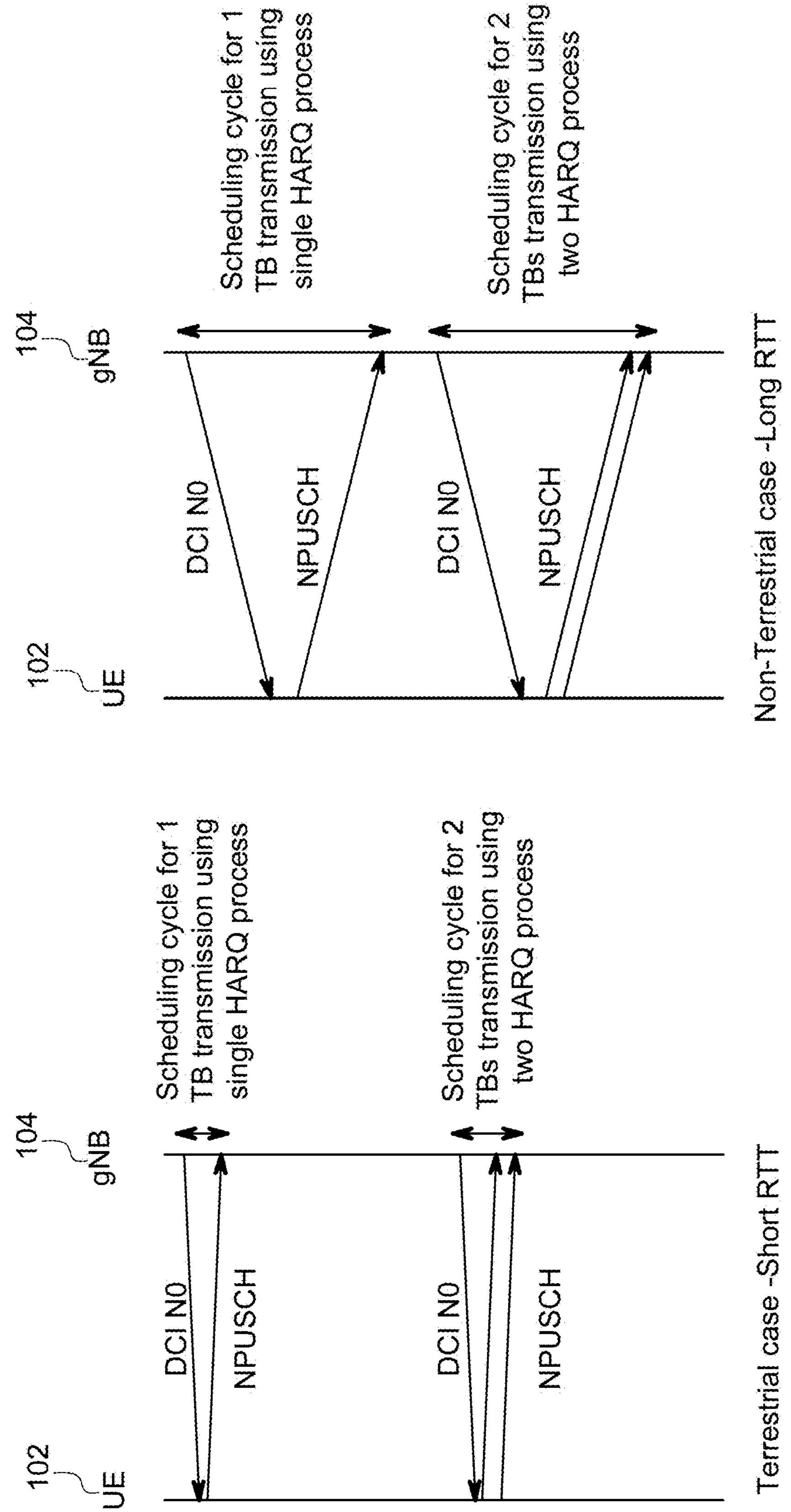
FIG. 2 shows the impact of long RTT and limited number of scheduled TBs using a single DCI on the UE UL data rate according to the system of FIG. 1.

As stated previously, NTN requires longer Round Trip Time (RTT) when compared to terrestrial networks due to long distances between satellites and surface-located User Equipment (UE)/gNB. Additionally, the number of uplink (UL)/downlink (DL) transmissions scheduled by a single Downlink Control Information (DCI) is limited due to 1) the limited number (e.g., two) of Hybrid Automatic Repeat Request (HARQ) processes in NB-IoT and 2) that constrained size of DCI. These protocol limitations in conjunction with the long RTT results in a long cycle for scheduling UE using DCI over NPDCCH and the subsequent UL/DL transmission over NPUSCH/NPDSCH, which functions to reduce the UE and network peak data rate. This issue is illustrated in FIG. 2, which shows the scheduling/transmission cycle for single-TB and two-TB scheduling in terrestrial network and NTN.

Figure 3:
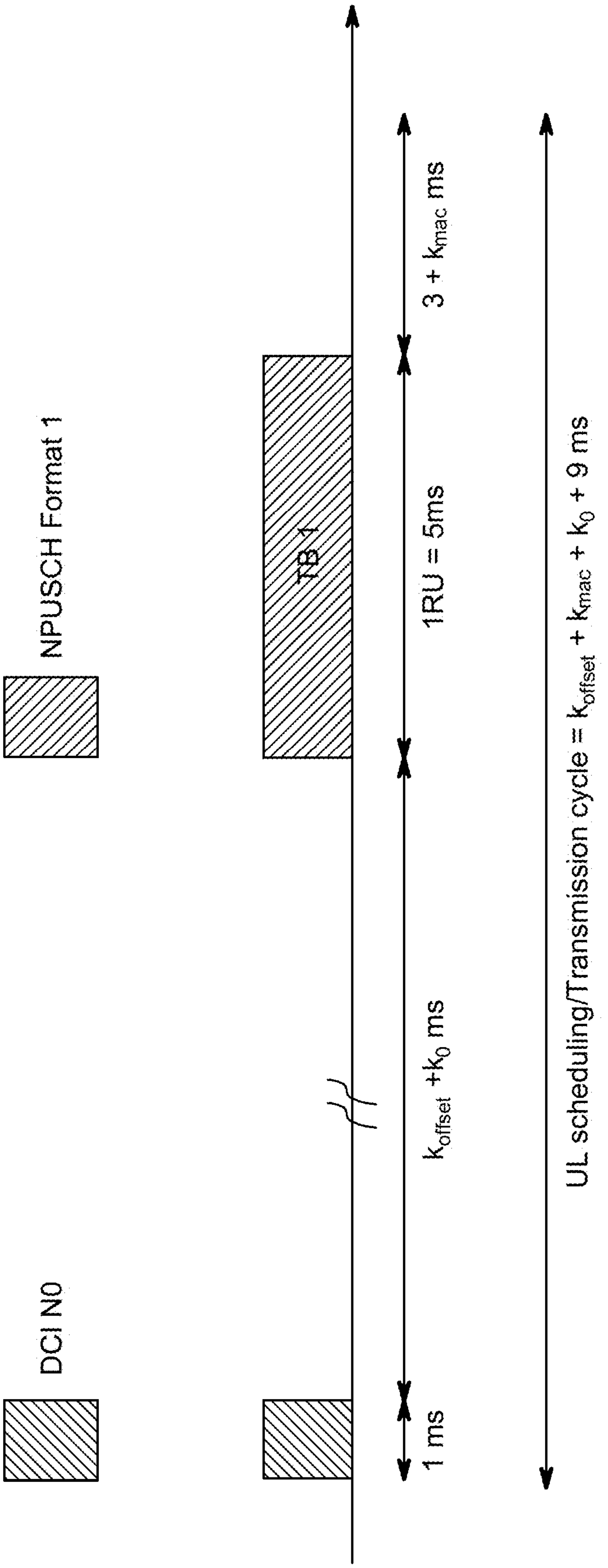
FIG. 3 shows the cycle of UL scheduling through NPDCCH and the subsequent NPUSCH for single TB transmission, indicating the total cycle duration according to the system of FIG. 1.
Figure 4:
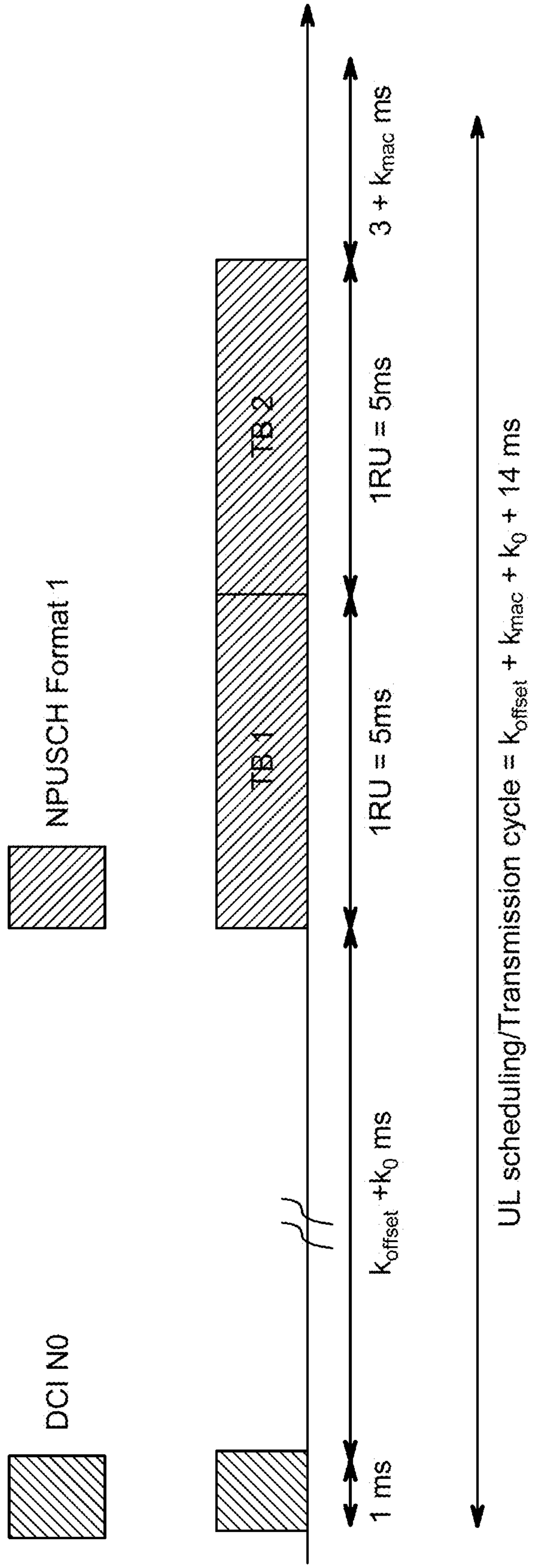
FIG. 4 shows the cycle of UL scheduling through NPDCCH and the subsequent NPUSCH for two TB transmission, indicating the total cycle duration according to the system of FIG. 1.

To quantify this impact and to form a basis for future comparison, peak UE UL data rate for single-TB and two-TB scheduling scenarios are calculated. For this purpose, one cycle of NPDCCH scheduling and NPUSCH transmission is illustrated for single-TB cases in FIG. 3 and for two-TB scheduling cases in FIG. 4.

Accordingly, as was stated previously, the current NB-IoT specification only allows up to two TBs scheduling using a single DCI N0. Likewise, increasing the number of TBs scheduled by a single DCI N0 requires additional HARQ processes and additional bits in DCI N0. As such, the UL data rate is severely limited.

HARQ feedback disabling is available for NB-IoT NTN such that the gNB can configure UE with a HARQ feedback disabled HARQ process. Therefore, any DL transmission that is occurring through this HARQ process will not have HARQ ACK/NACK feedback, and hence, no Media Access Control (MAC) layer retransmission. It should be noted that the MAC layer is a part of the data link protocol that controls access to the physical transmission medium in local networks. Similarly, any UL transmission that is occurring through this HARQ process will not have a MAC layer retransmission. In other words, from a MAC layer perspective, any transmitted packet is a new packet and there will be no retransmission. This means that the "New data indicator (NDI)" field in DCI N0 and DCI N1 has no application for a NPUSCH/NPDSCH transmission through a HARQ feedback disabled HARQ process.

However, the HARQ disabled HARQ process is available for the next transmission, right after the end of a first transmission. In other words, gNB does not need to wait until implicit/explicit confirmation of successful reception of one transmission to schedule another transmission using the same HARQ process.

Finally, as previously discussed, the UL scheduling in IoT NTN is a costly process, because there is one RTT between DCI N0 and the corresponding NPUSCH. As such, it would be good to facilitate the gNB to schedule as many TBs as possible using a single DCI.

It should be noted that, while various functions and methods will be described and presented in a sequence of steps, the sequence has been provided merely as an illustration of one advantageous configuration, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

In one configuration a method uses the NDI bit in DCI N0 together with a "Number of scheduled TB for Unicast" field to indicate scheduling of up to four TBs using a single DCI and through a HARQ feedback disabled HARQ process. These two fields in the structure of DCI N0 are highlighted in Table 2 shown below for DCI Format NO.

TABLE 2

| DCI Format N0 | |
|---|---|
| Field | Number of bits |
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| DCI subframe repetition number | 2 |
| Number of scheduled TB for Unicast | 1 |
| HARQ process number | 1 |
| Resource reservation | 1 |

Figure 5:
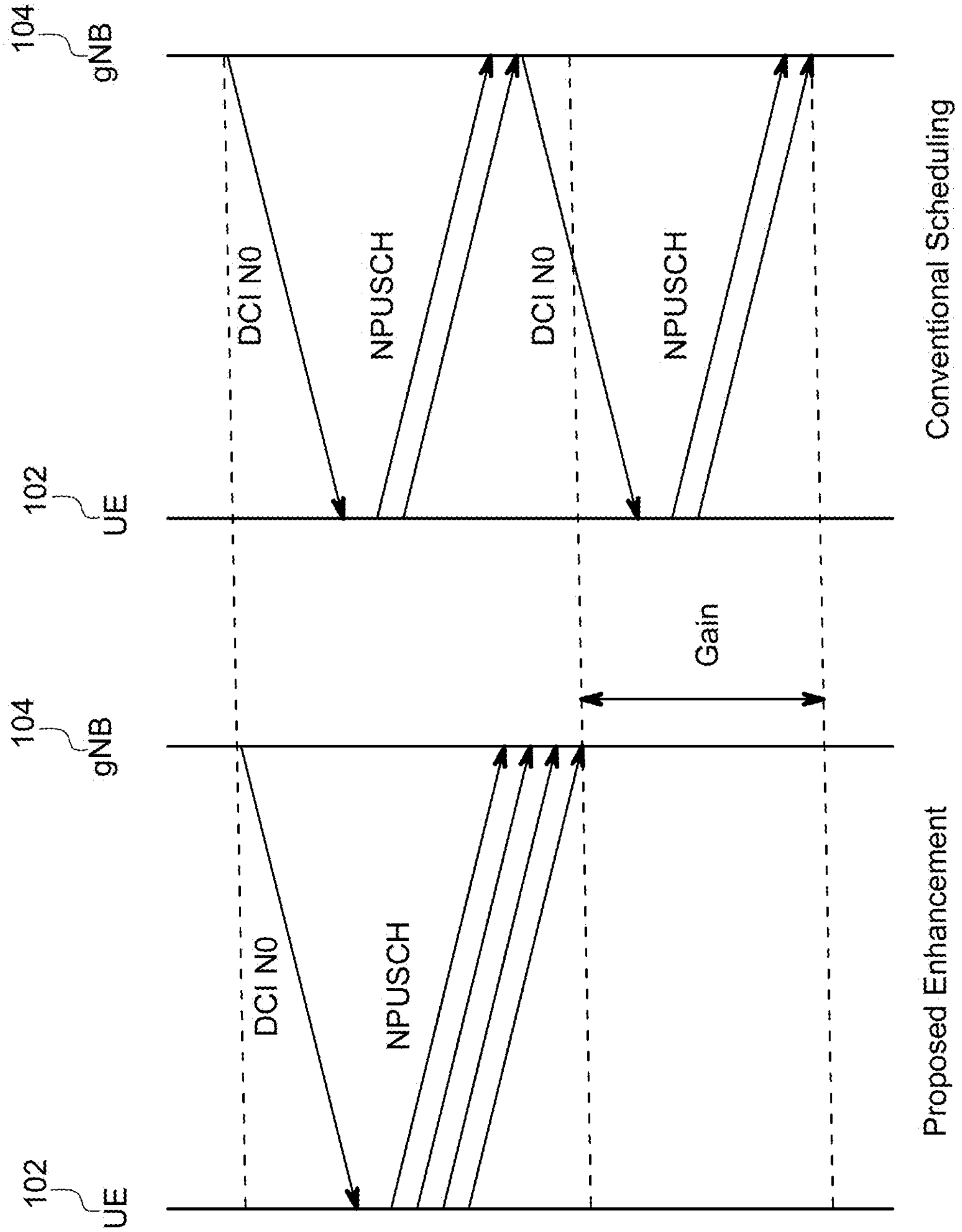
FIG. 5 shows the obtained gain in four-TB scheduling compared to conventional two-TB scheduling according to the system of FIG. 1.

The obtained gain using the proposed multi-TB scheduling is illustrated in FIG. 5. Conventional two-TB scheduling is compared in FIG. 5 with the proposed four-TB scheduling. As can be seen, the proposed method significantly reduces the total transmission time of four TBs. The exact amount of the obtained gain depends on the RTT.

To quantify the obtained gain by deploying this configuration, the result presented in Table 1 is extended to a four-TB scheduling scenario. The peak data rate of UE in UL direction in different scenarios is presented in Table 3.

When compared with conventional two-TB scheduling, a 97%, 72%, 65%, and 38% improvement in UE data rate for GEO, LEO1200, LEO600, and terrestrial NB-IoT is observed.

TABLE 3

| | | Two -TB sch. | | Four -TB sch. (This Invention) | |
|---|---|---|---|---|---|
| Scenario | Typical $K_{offset}$ (ms) | Cycle duration (ms) | UL rate (kbps) | Cycle duration (ms) | UL rate (kbps) |
| GEO | 550 | 572 | 8.87 | 582 | 17.43 |
| LEO1200 | 40 | 62 | 81.81 | 72 | 140.89 |
| LEO600 | 25 | 47 | 107.91 | 57 | 177.96 |
| Terrestrial NB-IoT | 0 | 22 | 230.55 | 32 | 317 |

One important aspect of this system and method is that the obtained gain is achieved without adding new bits to DCI N0, or any extra communication overhead. The only change needed to incorporate the proposed enhancement is to re-interpret the NDI bit of DCI N0, when the transmission is through HARQ feedback-disabled HARQ process.

DCI N0 has a bit length/size of 23 and is used for UL Grant (NPUSCH Scheduling). The bits are allocated as follows:

TABLE 4

| Field | Number of Bits |
|---|---|
| Flag for format N0/format N1 differentiation | 1 |
| Subcarrier indication | 6 |
| Resource assignment | 3 |
| Scheduling delay | 2 |
| Modulation and coding scheme | 4 |
| Redundancy version | 1 |
| Repetition number | 3 |
| New data indicator | 1 |
| DCI subframe repetition number | 2 |

In one configuration, the UEs behavior regarding interpreting DCI bits is explained as follows:

1) For the received DCI N0, UE checks the "HARQ process number" field.
2) If the HARQ feedback is disabled for the indicated HARQ process number, the actual number of scheduled TBs in UL is determined based on "New data indicator" field and "Number of scheduled TB for Unicast" field in the DCI N0 as given in Table 5, which provides for determining the number of scheduled TBs based on received DCI N0.

TABLE 5

| New data indicator | Number of scheduled TB for Unicast | Actual number of scheduled TBs |
|---|---|---|
| 0 | 0 | 1 |
| 0 | 1 | 2 |
| 1 | 0 | 3 |
| 1 | 1 | 4 |

3) Otherwise, the DCI fields are interpreted according to their current definitions Note that all the transmitted TBs scheduled by this DCI N0 uses the same HARQ feedback disabled HARQ process.

In another configuration, the same principle is applied to DL scheduling and transmission. For DL transmissions through a HARQ feedback-disabled HARQ process, the unused bits of DCI N1 can be used to indicate multiple TB scheduling (beyond conventional two-TB transmission). For example, "HARQ-ACK resource" field and "New data indicator" field can be used along with "Number of scheduled TB for Unicast" field (6 bits in total) to indicate the number of total scheduled TBs. Note that the first two fields need to be reinterpreted for a HARQ feedback disabled case to be used as part of the number of scheduled TB indicator.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method for increasing a peak data rate in HARQ feedback-disabled User Equipment (UE) in a Narrow Band Internet of Things (NB-IoT) non-terrestrial network (NTN) system where the UE is connected to a gNodeB (gNB) through a satellite, the method comprising the steps of:

receiving Downlink Control Information (DCI) format N0 at the UE;

the UE checking a Hybrid Automatic Repeat Request (HARQ) process number field in the DCI format N0;

the UE confirming that HARQ feedback is disabled for an indicated HARQ process number in the HARQ process number field; and the UE determining a number of scheduled Transmission Blocks (TB) in an Uplink (UL) based on a New Data Indicator (NDI) field and a Number of Scheduled TBs for Unicast field in the DCI format NO;

wherein, when HARQ feedback is disabled for the indicated HARQ process number, an NDI bit of DCI format N0 is re-interpreted together with the Number of Scheduled TBs for Unicast field to indicate scheduling of up to four TBs using a single DCI, and without using a HARQ-ACK resource field in DCI format N0;

the number of scheduled TBs being at least four using a single DCI without changing the DCI format N0, without adding any additional DCI bits or fields to DCI format N0.

2. The method according to claim 1, wherein the UE comprises a NB-IoT device.

3. The method according to claim 2, wherein the NB-IoT device comprises a sensor.

4. The method according to claim 1, wherein the gNB disables the HARQ feedback in the HARQ process number field such that there is no Media Access Control (MAC) layer retransmission.

5. A system for increasing a peak data rate in HARQ feedback-disabled User Equipment (UE) in a Narrow Band Internet of Things (NB-IoT) non-terrestrial network (NTN) system comprising:

software executing on a server transmitting Downlink Control Information (DCI) format N0 via gNodeB (gNB) to a gateway to a satellite and to a UE;

said UE checking a Hybrid Automatic Repeat Request (HARQ) process number field in the DCI format N0 and confirming that HARQ feedback is disabled for an indicated HARQ process number in the HARQ process number field;

and said UE determining a number of scheduled Transmission Blocks (TB) in an Uplink (UL) based on a New Data Indicator (NDI) field and a number of Scheduled TBs for Unicast field in the DCI format N0;

wherein, when HARQ feedback is disabled for the indicated HARQ process number, an NDI bit of the DCI format N0 is re-interpreted together with the Number of Scheduled TBs for Unicast field to indicate scheduling of up to four TBs using a single DCI, and without using a HARQ-ACK resource field in DCI format N0;

wherein the number of scheduled TBs being at least four using a single DCI without changing the DCI format N0, without adding any additional DCI bits or fields to DCI format N0.

6. The system according to claim 5, wherein the UE comprises a NB-IoT device.

7. The system according to claim 6, wherein the NB-IoT device comprises a sensor.

8. The system according to claim 5, wherein the gNB disables the HARQ feedback in the HARQ process number field such that there is no Media Access Control (MAC) layer retransmission.

* * * * *